(12) United States Patent
Tkac

(10) Patent No.: US 10,388,046 B1
(45) Date of Patent: Aug. 20, 2019

(54) SYSTEM AND METHOD FOR DISPLAYING PRESENTATIONS INCLUDING THREE-DIMENSIONAL OBJECTS

(71) Applicant: AVE INNOVATION s.r.o., Hermanice (CZ)

(72) Inventor: Jan Tkac, Ostrava (CZ)

(73) Assignee: PRESENTIGO, s.r.o., Pustkovec (CZ)

( * ) Notice: Subject to any disclaimer, the term of this patent is extended or adjusted under 35 U.S.C. 154(b) by 9 days.

(21) Appl. No.: 14/825,752

(22) Filed: Aug. 13, 2015

(51) Int. Cl.
| | | |
|---|---|---|
| *G06F 17/00* | (2019.01) | |
| *G06T 11/60* | (2006.01) | |
| *G06T 13/80* | (2011.01) | |
| *G06T 19/20* | (2011.01) | |
| *G06F 17/24* | (2006.01) | |

(52) U.S. Cl.
CPC ............. *G06T 11/60* (2013.01); *G06F 17/24* (2013.01); *G06T 13/80* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 8,503,985 B1* | 8/2013 | Belyaev | ............... | H04W 4/185 |
| | | | | 455/456.1 |
| 2009/0259941 A1* | 10/2009 | Kennedy, Jr. | ....... | G06F 17/3079 |
| | | | | 715/719 |
| 2010/0050082 A1* | 2/2010 | Katz | ...................... | H04N 5/272 |
| | | | | 715/719 |
| 2010/0153839 A1* | 6/2010 | Wilkins | ................ | G06F 17/248 |
| | | | | 715/235 |
| 2011/0013836 A1* | 1/2011 | Gefen | ................... | G06T 7/2093 |
| | | | | 382/171 |
| 2011/0055066 A1* | 3/2011 | Themmen | .............. | G06Q 40/00 |
| | | | | 705/35 |
| 2011/0063415 A1* | 3/2011 | Gefen | .................. | H04N 5/4403 |
| | | | | 348/43 |
| 2013/0057642 A1* | 3/2013 | Catchpole | .......... | H04L 12/1827 |
| | | | | 348/14.08 |
| 2015/0161565 A1* | 6/2015 | Kraft | ..................... | G06Q 10/00 |
| | | | | 348/441 |

* cited by examiner

*Primary Examiner* — Mustafa A Amin
(74) *Attorney, Agent, or Firm* — Thedford I Hitaffer; Hitaffer & Hitaffer, PLLC

(57) ABSTRACT

A system for displaying a presentation comprises a computer device, a sensing device for sensing user input, a communication module in communication with non-transitory storage with a three-dimensional (3D) object stored therein. A control module controls a presentation. The control module includes rules for loading metadata of a two-dimensional (2D) object located on a slide, and includes a generator of a 3D scene and a generator of the 3D object. The control module is in communication with the communication module, and sends requests for obtaining the 3D object and receives the 3D object. The communication module communicatively connects to the storage and forwards requests for obtaining the 3D object from the storage and downloads the 3D object. The generator of the 3D object generates the 3D scene the 3D object, based on loaded metadata of the 2D object and on the 3D object received from the communication module.

17 Claims, 2 Drawing Sheets

SYSTEM AND METHOD FOR DISPLAYING PRESENTATIONS INCLUDING THREE-DIMENSIONAL OBJECTS

BACKGROUND OF THE INVENTION

This invention relates in general to presentation tools and methods.

Presentations are very important marketing tools for businesses for facilitating attraction of new customers and strengthening interest of existing ones. In some fields, presentation is often the main business tool. Presentation methods vary especially according to the projection technology available. Presentation methods adapt to the latest technical solutions (e.g., cloud solutions, website presentations, or presentations on mobile devices, with diverse screen widths and performance capabilities).

Software allows simple creation of presentations as well as their browsing. The most common solution is, for example, PowerPoint™ from Microsoft®. Other solutions are, for example, provided by Apple and Google. These solutions are commonly used mainly to display static objects, which are fixed on presentation slides.

SUMMARY OF THE INVENTION

This invention relates to engagement of customers by means of presentation that requires innovative methods. These methods are designed to make the best impression and inform the customers about products or services. There is a high need for a presentation system and software that enables application of these new approaches.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
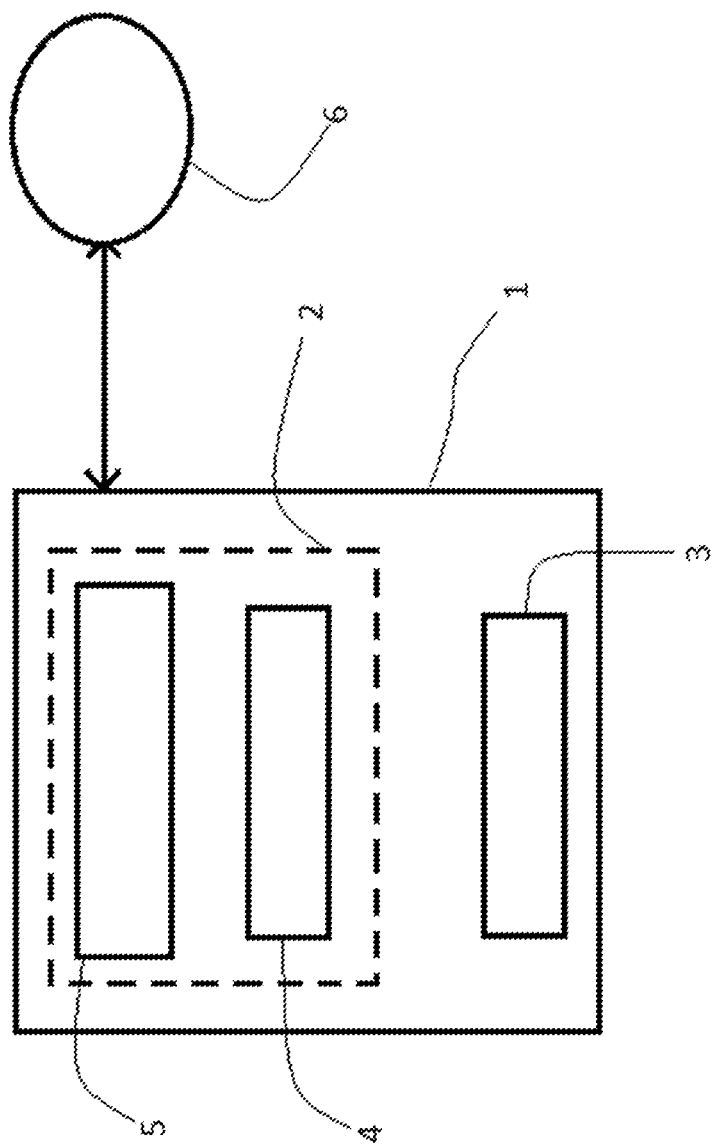
FIG. 1 shows a device used for presentation which includes the application.

FIG. 1 shows a device 1 that is used by operating personnel to control a presentation. This device comprises an operational system with an installed application 2 for presentation purposes in its memory. This application 2 contains automatic commands and options for user input 3 to control a presentation, but also includes application settings 2 and facilitates data communication between the device 1 and a remote storage 6 (e.g., a server that includes a database). This application 2 also contains a module used for preparation and creation of a presentation. In different embodiments of this invention, the module may be either part of the presentation application 2 or it can stand apart as an application for creation of presentations.

Presentation may be any file for presentation purposes (e.g., MICROSOFT® POWERPOINT® (.ppt), .pptx, Portable Document Format (.pdf) and other types of files). A user can switch a program ON. Immediately after basic data is loaded from the memory, the user will be asked to identify himself. After logging into the program, the user, as well as the connection with the user database, will be checked in order to verify user's rights. The application also allocates control options and access to various data and storage data 6 according to established rights. User authorization can be granted either locally within the device 1 used for presentations, or via an available network connected to a remote server. During the first launch of the application, a screen related to login or registration will be displayed. During the next launch, authorization may be done automatically. In another embodiment, user identification is not required, and the program continues automatically in accordance with predetermined parameters.

The device 1, on which the application 2 is installed, may be represented by different kinds of hardware. This includes a variety of personal computers (PCs), laptops, tablets and other mobile devices, which are commonly used. These devices use different operational systems. The application 2 is adapted to the operational system, in order to be able to use the application on the device 1 and benefit from all user inputs 3 allowed on device 1.

As already mentioned above, the application 2 includes a module for creation of presentations, which allows modification of the presentation displayed to the user. This module must meet various conditions for simple controlling and good optimization with respect to use of a created file. Creation of the presentation cannot place high demands on performance of device, which is used for creation of the presentation, at the same time it has to meet requirements for simple transfer from one device to another. For this reason, size of a presentation file is minimized in order to facilitate sharing of a presentation. Emphasis is placed on user's comfort during creation of presentation. For this purpose, the application 2 is modified as described below.

The module for creation of presentations includes all necessary tools for creation of presentation including commonly used two-dimensional (2D) objects 7 as well as special objects. Common 2D objects 7 are, for example, links, animations and inserted objects including text boxes, graphs and pictures. Special objects include three-dimensional (3D) objects 10. Therefore, the module for creation of presentations includes tools that allow modification of 3D object settings. The user there sets characteristics of 3D objects 10 in presentation. Furthermore, the user sets source of the 3D objects 10 (i.e., storage 6 where the 3D object is located). All user settings are then stored together with the presentation. Settings concerning 3D objects are saved in metadata of the 2D objects 7, in this case, in an image that is represented by a 3D object 10, as described below.

Figure 2:
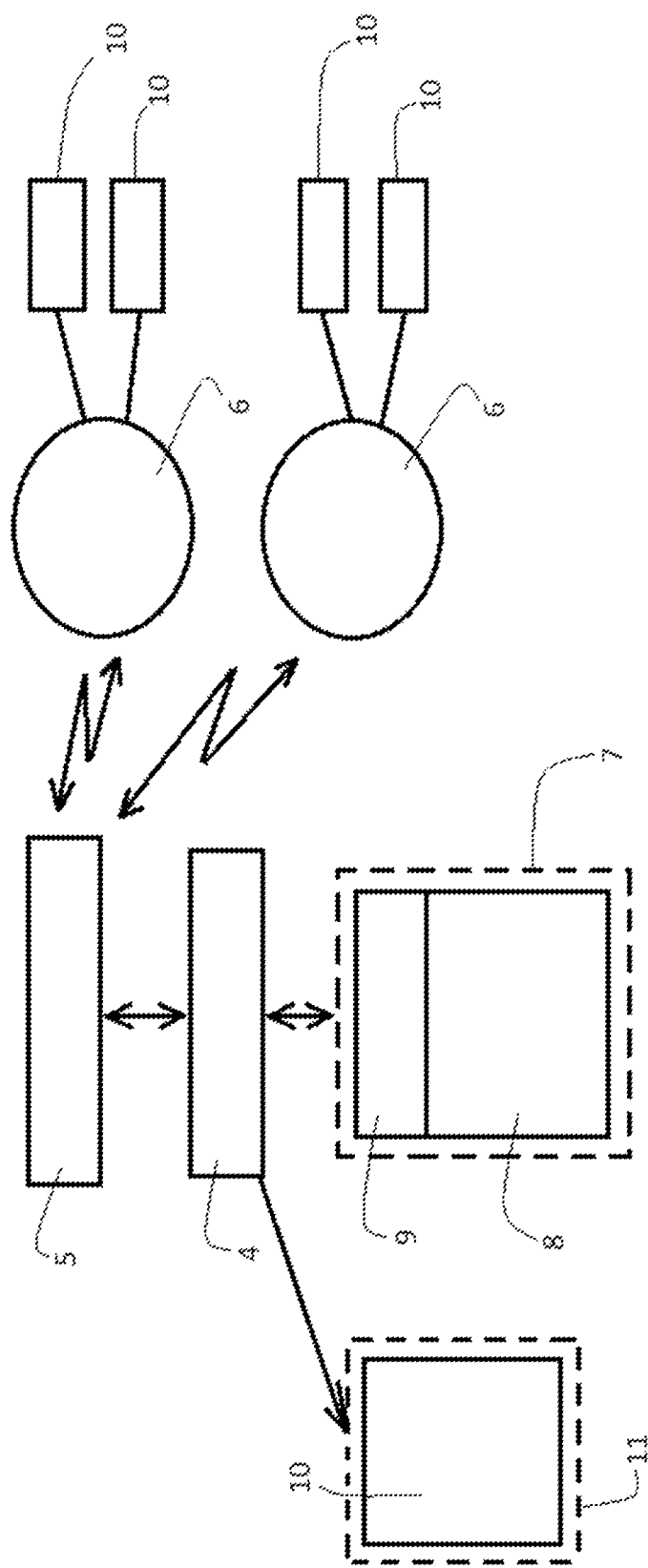
FIG. 2 shows communication between modules and relevant storage.

As already mentioned, one of the objects, which may be inserted into the presentation in a presentation editor, is 3D object 10. This object may be saved in various storages 6, as seen in FIG. 2. In different embodiments of this invention, storage may be local or remote. Local storage may include all devices for storing data, which may be connected to or be a part of the device for presentation editing. These may include hard disk drives (HHDs), solid state drives (SSDs), flash memory, compact discs (CDs), digital video discs (DVSs), BLUE RAY® discs and others. Remote storage includes storage, which is accessible via connection of the device to local network or internet (e.g., cloud storage).

The user selects a desired 3D object 10, to be inserted into the presentation, from respective data storage 6. In a user interface, the user determines where on the slide an object will be located. In the creation and editing mode of the presentation, the 3D object 10 is represented by a 2D object 7, which may be an image. The user determines the location by dragging an object 7 to desired location on the slide, where the object should be in its starting position. An object can be moved from this position or be edited after starting a presentation depending on settings, as described below. An inserted image 7 may include not only graphic data 8 but also metadata 9. This metadata 9 may be useful for obtaining information about the final 3D object 10, which will be displayed after presentation startup. This metadata 9 includes, for example, information about the location where an image is stored. In this case, a link to a specific location on a particular storage that may be accessed by a device 1 is stored in metadata 9. This information acts as a link between a picture 7 and 3D object 10. Apart from information about the location where an object is stored, metadata 9 may also include other configuration data or a configuration chain, which may be used by presentation software to determine the correct displaying of an object. This data may include object settings as well as 3D scenes settings 11 in which an object is inserted. Metadata 9 may also include display settings of a 3D object 10.

In one embodiment, metadata 9 is included directly within graphic data. The reason is that some operating systems do not allow working with metadata 9 and that is why metadata 9 is directly inserted into an image. In this embodiment, for example, a 2D object 7 is represented by an image; nevertheless, the last rows include special pixels, which do not represent image data but metadata 9. For example, the last two rows of the 2D object 7 include these special pixels. In the context of this invention, metadata 9 is used in a general sense, including both possibilities—metadata 9, which is located in an image file 7, but not in a graphic expression, and metadata 9, which is directly inserted in an image file, where it is part of graphic expression.

In one embodiment, this invention may be used, for example, in some institutions or organizations (e.g., school). The author of a presentation, in case of schools, a student, may use a website to find 3D objects 10 for his presentation. This special website includes 3D objects 10 represented by 2D objects 7 and students can download these 2D objects into their presentations. On this website, 2D objects 7 already includes metadata 9, thus the students can arbitrary work with these 2D objects 7 and these 2D objects 7 already have a connection to 3D objects 10. In order to create a collection of 2D objects 7 on this special website, the school can use services of third parties (e.g., supplier companies), which can create 3D objects 10 as a part of a set or as separate objects. In a favorable embodiment, software used for moving 3D objects 10 can be supplemented with a digital rights management (DRM) protection, which protects the author of 3D objects 10 in a sense, that the end user can manipulate only with 2D objects 7, which could be displayed as 3D objects only when a particular presentation is started and this 3D object 10 cannot be locally saved for further copying.

Since the metadata 9 is stored directly in a 2D object 7, the presentation can be created using any software, which allows creation of a standard presentation and insertion of images and other 2D objects 7. The user can insert an image on a desired slide and the necessary pairing with the original 3D object 10 will be done by special software for presentation startup.

When the presentation is launched, a module for controlling the presentation 4 is activated. This module 4 may include all necessary commands and features for the user to be able to go through the whole presentation with all interactions included in the presentation. After presentation startup, an object is activated by a corresponding slide, to which the object was assigned. The actual displaying of a 3D object 10 can have a startup condition (i.e., the object does not have to be displayed automatically after changing slides). This start up condition may be initiated by a countdown timer, which can be set while editing slides in object settings. Another startup condition may be an interaction of the user on the slide. This condition may be, for example, a click on a predefined part of the slide. After clicking on a predefined part of the slide, the object will be displayed in accordance with its settings. These startup conditions can be saved in the configuration chain, which is part of the metadata 9 of an image 7 inserted on the slide.

Due to the above-described function, a module for controlling a presentation 4 includes functions used for loading metadata 9 of a 2D picture 7, which represents a 3D picture 10. This data may be used by the module 4 to determine parameters and settings of the 3D object 10. If the presentation slide displayed contains pictures 7 with suitable metadata 9, the module for controlling 4 of the presentation will save the metadata 9, which will be used during the next loading of the 3D object for its implementation on the slide. The module for controlling 4 the presentation communicates with a module for communication 5 in order to ensure a connection with the storage 6. This process is shown in FIG. 2. The module for communication 5 ensures a connection between the presentation software and the storage 6, in order to be able to transfer the object on the slide. If the module for controlling 4 detects metadata 9 in the picture 7 on the slide, it will also find an identification of the object, which is used for correct selection. Based on this data, the module for communication 5 can find the right path to a file in a relevant storage 6. The module for communication 5 connects to the relevant storage 6 and selects a file. This file is given back to the module for controlling 4 presentation and this module 4 sets up a 3D scene 11 and a 3D object 10 with metadata 9 of the picture 7.

On the slide, the 3D object 10 is displayed on a particular 3D scene 11. This 3D scene 11 can be activated prior to the object displaying according to the startup conditions described above. The startup conditions may be common or different for an object and a scene. In one case, a scene can start prior to an object displaying depending on other conditions. In another case, both a scene and an object can start simultaneously depending on the startup condition. This condition may also display the slide only.

After displaying the 3D object 10, the object and the scene will be created at the place, which was configured during the creation of the slide by dragging an image 7. There, the object is either locked or its characteristics and current configuration may be modified. After startup, the current displaying of the object display may either be or not be influenced by user. This also depends on the object's configuration in metadata 9 saved in an image 7. If an object is locked, it is displayed according to predetermined settings; the user cannot influence the displaying of the image. In this mode, an object can be either fully static or its parameters and location may be modified according to predetermined scenario, which is configured during the creation of the presentation. Variable parameters may include the size of displayed object, its rotation, the position on the slide, transparency with respect to the background and the object's configuration.

Variable parameters of a 3D object 10 can be modified, for example, by clicking a mouse on a specific location or by pressing a predefined key. Connection of these user inputs 3 is displayed in FIG. 1. In an embodiment, where the presentation device 1 is equipped with a touch sensor, the variable parameters can be modified by touch gestures. A touch gesture can be either punctual or a sequence of touches or various touch gestures. All these methods, how to detect a touch and a predefined condition are understood by those skilled in the art. This may include detection by stretching or rotation of fingers, which are in contact with the detection device. Furthermore, it is also possible to detect multiple touches simultaneously, if the device 1 is equipped with multiple or a multi-touch sensor. Reaction of an object then corresponds to a given gesture in an intuitive way. For example, when a user performs a rotation on a touch device with two fingers, it may cause a rotation of the object.

Another method to detect user inputs is through a special camera, which detects movement of body parts in space. An example of such a device is a device sold under the name Kinect® by Microsoft. With the use of such systems it is possible to use, for example, hand movement to control the screen. In this embodiment, an object in the presentation can be controlled by hand gestures. In addition to individual gestures, it is possible to zoom in and zoom out real objects towards and away from the detection system, if such a detection system is connected. Each type of motion can then be assigned a different kind of object parameter, which will then be demonstrated on the slide.

Modifiable parameters of 3D objects 10 can be modified based on an engine, into which an object is inserted and which is related to its location and movement within slide. One of modifiable parameters is the object's position within the slide. An object is moving in direction that was predetermined in settings by a user. This means that an object is moving according to its settings and according to a user's actions. These settings can be part of an engine or metadata representing an image 7. Another changeable parameter is rotation of an object and modification of its dimensions. These parameters can be based on, for example, detected touches on a device 1. Rotation of an object occurs within an engine into which it is inserted. An object's dimensions can be modified within an engine. Use of this invention is not limited to a combination of above-mentioned object parameters and it allows a user to create various combinations of changes of an object's parameters based on different settings in metadata 9 and software settings based on a user's actions.

Another changeable parameter of an object is a variation of a displayed 3D object 10. An object can have several different states of being displayed, for example, a different color, a different shape, or with additional sub-objects.

A 3D scene 11 of an object, in which an object is displayed, is dependent on the usage of a particular technology of 3D engine. For presentation purposes, any 3D engine, which is suitable for this purpose, can be used. An example of such a 3D engine is Unity 3D.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for creating, modifying and displaying a slide presentation comprising:
    a computer device comprising:
        a display for displaying a slide presentation, wherein the slide presentation is at least one file format selected from a group of file formats including XML-enabled file formats,
        a sensing device for sensing user input for creating, modifying and displaying the slide presentation based on the user input,
        a communication module in communication with non-transitory storage storing a three-dimensional (3D) object,
        the sensing device connected to a control module, the control module controlling the slide presentation based on user input sensed by the sensing device, the control module inserting a two-dimensional (2D) object in a slide based on user input sensed by the sensing device, the slide presentation including rules for loading metadata of the 2D object located on the slide, and including a generator of a 3D scene and generator of the 3D object, wherein the 2D object is a 2D object only, with the metadata that references the 3D object,
        the control module in communication with the communication module, sending requests for obtaining the 3D object and receiving the 3D object, and
        the communication module communicatively connected to the non-transitory storage, forwarding the requests for obtaining the 3D object and downloading the 3D object, and
        the generator of the 3D object generating the 3D object in the 3D scene, the 3D object based on the loaded metadata of the 2D object and based on the 3D object received from the communication module, wherein the metadata includes information about where the 3D object is stored on the non-transitory storage for obtaining the 3D object and downloading the 3D object from the non-transitory storage.

2. The system according to claim 1 wherein the 2D object is a picture.

3. The system according to claim 1 wherein the storage is a cloud storage.

4. The system according to claim 1 wherein the storage is a local storage.

5. The system according to claim 1 wherein the storage is in a portable device.

6. The system according to claim 1 wherein the sensing device is at least one peripheral device selected from a group consisting of a mouse and a keyboard.

7. The system according to claim 1 wherein the sensing device is a touch sensor.

8. The system according to claim 1 wherein the sensing device is a movement detector.

9. The system according to claim 1 further comprising digital rights management (DRM) protection.

10. The system according to claim 1 wherein the metadata of the 2D object includes information about settings of the 3D object on the slide.

11. The system according to claim 10 wherein the information about the settings includes information about a position of the 3D object.

12. The system according to claim 10 wherein the information about the settings includes information about the 3D scene.

13. The system according to claim 10 wherein the information about the settings includes information about a visual setting of the 3D object.

14. The system according to claim 10 wherein the information about the settings includes information about a reaction of the 3D object to a user input.

15. The system according to claim 1 wherein the metadata is not part of a graphical expression of the 2D object.

16. The system according to claim 1 wherein the metadata is part of a graphical expression of the 2D object.

17. The system according to claim 1 wherein the metadata of the 2D object includes information about settings of the 3D object on the slide, wherein the information about the settings is selected for a group of information comprising information about a position of the 3D object, information about the 3D scene, information about a visual setting of the 3D object, or information about a reaction of the 3D object to the user input.

* * * * *